United States Patent Office 3,500,469
Patented Mar. 10, 1970

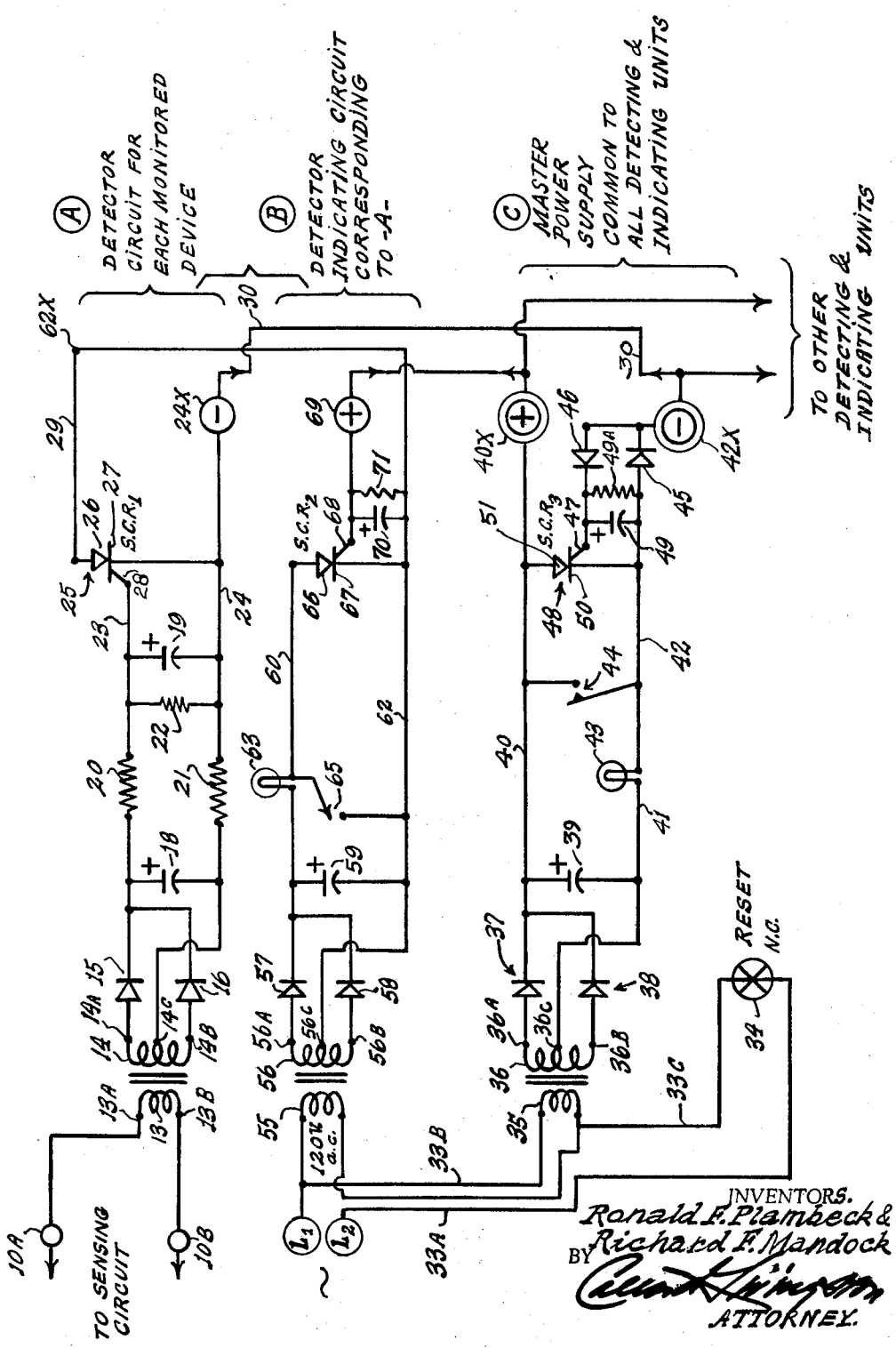

3,500,469
FAULT INDICATING SYSTEM FOR A PLURALITY OF MONITORED DEVICES
Ronald F. Plambeck, Chicago, and Richard F. Mandock, Schiller Park, Ill., assignors to Protection Controls, Inc., Skokie, Ill., a corporation of Illinois
Filed Feb. 11, 1966, Ser. No. 526,889
Int. Cl. G08b *29/00;* G08b *19/00;* H04q *3/00*
U.S. Cl. 340—213  21 Claims

ABSTRACT OF THE DISCLOSURE

A fault indicating system operable from a source of monitor signals. Each signal source controls a corresponding monitor unit comprising a detector circuit and an indicating circuit. A master power supply serves all monitor units in a group, and individual power supplies energize tell-tale unit-indicators in each monitor unit. Triggerable or gated electron-control devices in the detector indicating and master power supply circuits are arranged in such manner that master current flows in a triggered detector circuit responsive to a monitor signal, and this current triggers the corresponding indicator control devices followed closely by triggering of the master power control device, to actuate a master failure indicator and shut off master power to all monitor units, the tell-tale indicator of the first unit to fail remaining in operation along with the master indicator until the system is reset.

---

This invention relates to equipment monitoring and fault-indicating apparatus for use with safety and supervisory monitoring systems of the type adapted to give a visual or other form of indication of the failure or interruption of operation of one or more units in response to signals received from some form of sensing or supervisory circuit means associated with each unit such, for example, as might be supplied by operation of supervisory relays, switches and interlocks in paper-making machines, or by interruption of flame-rod currents in a battery of gas-fired heat-treating furnaces, or the like, wherein the failure of a single burner commonly results in instantaneous shutting off of the fuel supply to all burners as a safety measure In such installations it is important to know which particular unit was the first to fail; and if several units have failed simultaneously or one after another, it is necessary to know that all causes of failure have been cleared or accounted for in connection with all of the units involved before the system is again set into operation. A prime requisite of all such supervisory equipment is reliability.

The present disclosure provides a fault-indicating system of simplified and compact character employing a plurality of electron control devices, preferably of the solid-state variety and preferably of the character of the Silicon Controlled Rectifier, arranged in interdependently coacting monitor sets each comprising a detecting and indicating unit corresponding to a particular one of the monitored devices with each said monitoring set interdependently served and coacting with a single power supply unit common to all such sets (or to a desired plurality thereof) in such manner that a failure signal detected by any set results in an indication, as by an illuminated telltale lamp corresponding to the particular monitored device which has failed, immediately followed by a shutting off of the common power supply in response to the first failure detected A further feature of the system resides in the provision of manual resetting means which will instantaneously give repeated failure signals responsive to each attempted resetting operation so long as any failure signal is detected after one or more of the troubles which have caused preceding failure indications have been cleared, in order that the system as a whole shall not be restored to operation until all existing sources of trouble or failure are cleared or accounted for.

The addition of certain testing means in conjunction with the interdependent coaction of the three functionally-related units comprising each monitoring set, that is to say a detecting unit and an appertaining indicating unit and the common power supply unit considered as a necessary component in the action of any given monitoring set so far as its fault-indicating action is concerned, affords a cross-check between each detector and its indicating circuit, as between the several monitoring sets one with respect to another, and as between the power supply as such and its master control function with respect both to individual monitoring sets and the totality of monitoring sets, all such indicating testing and cross-checking functions being achieved with very simple circuit components which may be in the form of extremely compact modules making up an easily installed, easily serviced and physically quite small control installation capable of providing fault-indication for a very large number of monitored devices.

Additional features and aspects of novelty and utility pertain to details of the preferred embodiment of the invention as described in view of the accompanying illustration presenting in a single view the circuitry and circuit components comprising a detecting unit and its corresponding indicating unit constituting one monitoring set, together with a power supply unit interdependently coacting with such monitoring set and as many additional monitoring sets as may be required.

The single figure of drawing depicts the circuit diagram for one monitoring set, consisting of a detecting unit A and a corresponding indicating or signalling unit B, such set being served by an interdependent power supply unit C normally coacting with any of a plurality of such monitoring sets in accordance with the requirements of a given installation.

In general, the operation of the system is such that a failure or fault originating in one, amongst several, monitored or supervised devices, such, by way of example, as gas-fired furnaces, will give rise to a monitoring signal sensed by the corresponding Detector Unit A and indicated by the Tell-Tale Lamp of an appertaining Indicator Unit B, concurrently with a complete shut-down of the entire indicating system as a result of cutting out of a common Power Supply Unit C, which will always respond to the first failure sensed, should several occur in succession.

Referring to the drawing, a source of monitoring or supervisory signal energy will be connected to input terminals 10A, 10B, and will traverse the primary or input winding 13 of a coupling transformer having an output winding 14 with terminals 14A, 14B, and a center tap 14C.

The signal energy may be any current or voltage effect of a character capable of imparting a triggering or gating pulse to an electron control device such as a Silicon Controlled Rectifier 25, also designated S.C.R.$_1$ in the Detecting Unit A. The signal may be a repetitious or single pulse or the interruption of a steady-state current, caused for example, by operation of a Master Relay (not illustrated) such as used in a flame-supervisory circuit of the type shown in U.S. Patent No. 3,266,026 (S.N. 12,713), operating, for example, in response to a flame failure to shut off the main fuel supply for a battery of heat-treating furnaces or the like.

Whatever the nature or source of the monitor or sensing signal, the purpose is to effect application of a triggering voltage of given polarity on conductor 23 to trigger electrode 28 of S.C.R.$_1$ whereby to render the appertaining anode-cathode path 26, 27 conductive.

The monitoring or supervisory signals traversing the primary winding 13 reappear across terminals 14A, 14C and 14B, 14C are oppositely-poled half-wave resultants of the original pulse, which are rectified by means such as the diodes 15, 16, affording a unidirectional full-wave equivalent D.C. triggering signal, smoothed out by filter means such as the capacitors 18, 19, and resistor network 20, 21, 22, this trigger control being available from the output of the filter means on conductors 23, 24, at a preferred level of about 6 volts, with sensitivity limiters 20, 21.

At this juncture, it is observed that the aforesaid D.C. control or triggering signal on conductors 23, 24, whatever its character, whether pulsating or a steady-state current, is utilized in the detecting circuit A essentially to trigger the electron control device S.C.R.$_1$ into the conductive state with consequential interdependent triggering of other such S.C.R. devices in the associated Indicating Unit B and the Power Supply Unit C.

The power supply for the illustrative Detector-Indicator Set A, B, may be energized from the usual commercial power line at terminals L$_1$, L$_2$, connecting via conductors 33A, 33B, 33C, and a normally closed reset switch 34 to the primary 35 of a step-down transformer having a secondary 36, the terminals 36A, 36B, 36C of which are connected in a rectifying circuit with rectifying means such as the diodes 37, 38, and a filter capacitor 39 to provide about 6 volts D.C. across power supply conductors 40, 41, in series with a signal lamp 43 controlled by S.C.R.$_3$, such that the rectified voltage is normally available on supply conductors 40, 42, and the S.C.R.$_3$ device is normally non-conductive, under which conditions the current drain is too low to cause illumination of lamp 43. A normally-open test switch 44 is connected across said power supply conductors for manual closure to shunt or short-circuit the same around the anode-cathode path 48–50 and through lamp 43 for the purpose of testing the lamp 43.

One of the aforesaid supply conductors 40 is connected with the positive power supply terminal 40X, while the remaining conductor 42 connects with negative supply terminal 42X, the D.C. power from these terminals being the source of direct current utilized in the remaining two S.C.R. control sections of the set, and all other similar Detector-Indicator Sets in the system, said supply terminals 42X, 40X respectively connecting with the sub-terminals of like polarity 24X and 69, jointly shared by the two appertaining detecting and signalling units of the set, as will more fully appear.

The D.C. current afforded by the power supply connects to the negative supply terminal 42X only through the cathode 50 and trigger electrode 47, and a unidirectional conducting device such as the diode 46, while negative power conductor 42 is blocked from terminal 42X by an isolation means comprising another reversely-poled diode 45 connected between said terminal and conductor 42. A capacitor 49 and resistor 49A connecting across the trigger 47 and cathode 50 of said control device, afford a delay circuit preventing too rapid triggering-out of the power supply.

It will now appear that the power supply S.C.R.$_3$ is normally non-conductive, but will be gated or triggered by current drawn through its cathode trigger path 47, 50. Thus, rectified D.C. supply current is normally constantly present on conductors 40, 42 and at terminals 40X and 42X.

Whenever the voltage becomes positive at the trigger side of the power controlling S.C.R.$_3$, the corresponding anode-to-cathode path 48, 50, becomes highly conductive amounting to a short-circuiting across power-supply terminals 40X, 42X and shunting the power through the "failure" warning lamp 43, to cause it to become illuminated.

The third and remaining control function of each monitoring set in the system resides in the signalling or indicating section B which is also energized from the service-main terminals L$_1$–L$_2$ through the primary 55 of another step-down transformer, having a secondary 56 the output of which is similarly rectified by a pair of full-wave rectifying diodes 57, 58, connecting with secondary terminals 56A, 56B and common negative voltage center top terminal 56C to the conductor 62 extended to a junction 62X with the anode lead 29 of the detecting S.C.R.$_1$.

The positive rectified voltage from the cathode of diodes 57, 58, is provided with filter capacitance 59 and connected through a normally non-illuminated Tell-Tale Lamp 63 to a conductor 60 connecting to the anode 66 of the second S.C.R., the cathode 67 of which connects to the negative voltage conductor 62, and the trigger 68 of which connects to a positive sub-terminal 69 adapted for interconnection with the main positive D.C. supply terminal 40X.

The negative signal voltage conductor 24 by its terminal 24X is likewise adapted to be interconnected with the main negative supply terminal 42X as by conductor 30.

Resistor 70 and capacitor 71 are shunted across the cathode-trigger path 67, 68 primarily to suppress transients.

The operation of the fault indicating system is such that upon appearance of a failure signal from the sensing circuit connecting to monitoring terminals 10A, 10B of the first or detector section A, an appropriate potential will be applied to the trigger electrode 28 of S.C.R.$_1$, thereby rendering the appertaining anode-cathode path 26, 27 conductive.

In consequence of the conductive path via the anode and cathode electrodes 26, 27 aforesaid, current is drawn from the power supply section C. This current flow corresponds to an electron displacement via power conductor 42, cathode 50 of S.C.R.$_3$, trigger electrode 47, diode 46 to the negative main power terminal 42X, conductor 30 to terminal 24X, S.C.R.$_1$, cathode 27, anode 26, junction 62X to S.C.R.$_2$, cathode 67, trigger electrode 68, and sub-terminal 69 to main positive terminal 40X. Two things are important in this curent flow: each of the two trigger electrodes 47 and 68, respectively associated with the indicating section B and power section C is left at a positive potential relative to the associated cathode, thereby causing a firing or gating of the corresponding electron control devices, that is to say, S.C.R.$_2$ and S.C.R.$_3$. Moreover, the delay means 49, 49A in Unit C assures that the Silicon Controlled Rectifier in the indicating section B will fire first, followed by or at least concurrently with firing of S.C.R.$_3$ in the power unit, it being important that the power supply shall not trigger-out too rapidly ahead of S.C.R.$_2$ since it cuts off the power utilized to fire S.C.R.$_2$.

In consequence of the foregoing operations, lamps 43 and 63 become illuminated, Tell-Tale Lamp 63 indicates which particular one of the monitored devices (among several) was the first to fail or responded first to some sort of failure possibly affecting several or all of the monitored devices, as in the case of a fuel supply. The Master Lamp 43 need not necessarily be located in adjacency to the lamps 63, but in any case is intended to signal that the shut down has properly included and been triggered through the power supply.

Here it will be observed that should the cause of the failure spontaneously clear itself, the entire system nevertheless would remain shut down and require supervisory manual intervention to restore the system to operation because the power supply must be reset. This is advantageous for a number of reasons, one of which is that if more than one cause of failure exists, or if several monitoring sets corresponding, say, to several gas burners in a large group happen to fail at one time, it is not only often important to know which one failed first, or which particular burners failed while others did not, but it can be highly dangerous with gas furnaces, for example, to attempt to restore an entire group to operating condition after having cleared trouble on only one of them where the possibility exists that others may still remain in trouble. There are many variations of these situations depending upon the nature of the equipment being monitored.

In order to reset the system following a shut down, as aforesaid, the attendant will manually operate Reset Switch 34 to open the same, thus breaking the A.-C. line supply to the transformer primaries 35 and 55, which at this time will be supplying the power which illuminates the two signal lamps 43 and 63 dependently upon current flow through S.C.R.$_2$ and S.C.R.$_3$ which have been triggered into the conductive state. When the current supply is thus shut off at the source through these two electron control devices, they are automatically restored to the non-conductive state; and if the trouble has been cleared or there has been merely a temporary fuel interruption, the two signal lamps will be and remain extinguished by such operation of the Reset Switch 34.

But, if the trouble has not been cleared when the Reset Switch is thus actuated, the system will trigger itself out again with repeated illumination of lamps 43 and 63 showing that trouble still exists. Or, in the case of simultaneous failures, including more than one monitored burner or other device, wherein trouble may have been cleared in one or several but not all failed equipment, the the Indicating Lamp 63 of those devices which remain failed will come on one by one each time the Reset Switch is operated and the troubles in the appertaining monitored devices are cleared one by one, and complete clearance will only be signalled by absence of any illuminated lamp following the last operation of the Reset Switch which brings about this no-lamp result.

Thus, it may be observed in summary that the S.C.R.$_1$ devices in the detector units will be automatically restored to the non-conductive state when current flow is shut off by triggering-out of the power unit. But if the trouble pertaining to any particular detecting unit has not been cleared at the time the Reset Switch is actuated, the whole triggering-out and shut-down operation will be repeated every time said resetting switch 34 is actuated until the trouble is at last cleared, unless, as previously noted, there happen to be troubles in several monitored units at the same time, in which case the previously-described repetitious triggering-out action will continue until the last source of trouble has been eliminated.

When either of the test switches 44 or 65 is closed, the corresponding lamps 43 and 63 should light. If they do not, a burned-out lamp or possible failure in the appertaining Power Supply Means 36–37–38, or 56–57–58 is indicated, the latter Power Supply also being the source of the current which is conducted in the chain circuit extending through the anode-cathode path in the detector unit, as well as through cathode-trigger paths in the indicating and Power Supply Units, so that this simple testing means affords a quick check on critical aspects of any of the monitoring sets in the system.

The detecting and indicating sections A and B may be made up in one or separate modules, while the power unit C will preferably be provided as a separate module, since the number of monitoring sets A, B required will vary from one installation to another, while a single power unit will normally serve any number of detecting and indicating sets.

It will be observed that a feature of the apparatus or system is the provision of a chain triggering circuit which extends from Power Supply Source or line 42 via anode 50, trigger 47, terminal 42X, through the detector anode-cathode path 26, 27, thence via cathode 67, trigger 68 of the Indicating Circuit to be returned to the remaining Power Supply Terminal 40X. This chain is normally broken or open at detector anode-cathode 26, 27; when this path is triggered into conductivity by a supervisory or Monitor Signal, current flows via the other two trigger electrodes with appropriate polarity to fire control devices of both the appertaining indicator circuit and the common Power Supply Circuit, with the ultimate result that the latter control devices fire almost concurrently, it being remembered that the delay means 46, 49, 49A, gives the firing preference to the indicator circuit first, so that the power is not shut off too soon.

The expressions "Tell-Tale" and "Master," as applied to the indicating lamps 43, 63 or other desired signalling means, are not limiting and are employed to conveniently distinguish between the indication which identifies which particular detecting unit or set has been actuated, and the general master signal at the Power Supply, which simply signifies that a failure has been detected and responded to, while the individual signal means 63 designates the particular unit or set which has responded.

The circuitry illustrated, employing unidirectionally conductive electron-control or electro-conductive devices supplied with rectified A.C. for the conduction in the anode-cathode paths as in the case of devices 25 and 48, affords a highly sensitive fast-acting and quick reset system, which may employ any of a selection of commercially-available half-wave triggerable control device, the S.C.R. type being particularly favored because of their high current-carrying capacity and relatively rugged character, it being contemplated nevertheless that other suitable types of triggerable control device of the class described may be employed.

Thus, the disclosure broadly contemplates a circuit system responding to monitor signals employing triggerable conductive devices of the class described which traverse the trigger-cathode path in the first or detecting circuit; wherein the trigger-cathode path of the second or indicating or tell-tale circuit is traversed by the anode-cathode current conducted by the first device; wherein the current conducted by the anode-cathode path in the first device traverses the trigger-cathode path in a third such device, with the result that when a monitor signal triggers the first device to conduct a current, such current in traversing the trigger-cathode path in the second device triggers the same, and this same current in traversing the trigger-cathode path in the third device triggers the latter; the conductive states of the second and third such devices being utilized to actuate some form of signal or alarm or indicating means.

We claim:

1. In an equipment failure or like alarm and indicating system responsive to signals from monitor sources, a monitor unit for each monitor signal source, each unit including a detector circuit having a trigger circuit and an indicating circuit having an identifying tell-tale indicator and a trigger circuit; a master power supply circuit serving all monitor units and including a master indicator and a master trigger circuit; means providing a separate power supply for each tell-tale indicator which supply is independent of said master power supply circuit; each of said detector, indicating and master power supply circuits including at least one normally non-conductive triggerable electron control device with trigger control electrode means operative to render the same conductive; each detector circuit control electrode being connected in its trigger circuit for actuation by a corresponding monitor signal; the control device of each detector circuit having connection with power from the master power supply circuit to conduct a master current responsive to triggering of such detector control device to conductive condition by a monitor signal; the respective triggering circuits for all indicating circuits being connected with said master current to be affected thereby when conducted by any detector control device as aforesaid whereby to render the appertaining indicator control device conductive, such devices when rendered conductive as aforesaid causing power from the corresponding separate power supply to actuate the appertaining tell-tale indicator; flow of master current responsive to triggering action in a detector circuit as aforesaid causing triggering action in the corresponding indicator circuit followed by a triggering of the master supply circuit control device to conductive condition, whereby to actuate the master indicator and to instantly thereafter interrupt master current to all monitor units served thereby; together with reset circuit means operative to restore trigger control devices to a non-conductive condition in readiness for further triggering action responsive to monitor signals as aforesaid.

2. An indicating system according to claim 1 wherein said electron control devices are of the solid-state type known as Silicon Controlled Rectifiers each having a trigger electrode, together with an anode and a cathode through which a current path is provided in the said conductive state thereof responsive to application of a predetermined triggering potential to said trigger electrode thereof, said trigger electrode being utilized as the control electrode means aforesaid.

3. An indicating system according to claim 1 wherein said electron control devices are of the solid state type each including together with the control electrode aforesaid an anode and a cathode, and said conductive state thereof affords a current-conduction path through the anode and cathode of such control device and said device respectively continue in the conductive state so long as the conducted anode-cathode current continues at a predetermined minimal value, said devices being rendered conductive responsive to a predetermined triggering potential acting between the appertaining control electrode means in respect to the appertaining cathode thereof, the current path through the anode and cathode as aforesaid being uni-directional.

4. The indicating system of claim 1 wherein said telltale signal means is connected in an energizing circuit with the appertaining separate power supply and said energizing circuit is completed through the appertaining electron control device in its conductive state, the said electron control device being of a character to change into the non-conductive state responsive to interruption of the flow of said energizing current therethrough, said energizing current being interruptable by selectively-operable switch means connected for operation to diminish the flow of such energizing current conducted by said control device, whereby to restore the latter to its non-conductive state.

5. The indicating system of claim 1 wherein said electron control devices are bi-stable solid-state conductive devices having the characsteristics of the Silicon Controlled Rectifier and each including an anode, a cathode and a triggering electrode, said triggering electrode being employed as the control electrode aforesaid, a source of alternating voltage being employed as the recited appertaining separate power supply for energizing each said indicating circuit in part, and said power supply circuit in part; each said indicating circuit including appertaining means for rectifying the alternating current supplied thereto from said voltage source, said tell-tale signal means being connected for operation by recitified current afforded by the corresponding said rectifying means and acting through the anode-cathode path of the appertaining control device when triggered to the conductive state; a triggering voltage for operating the control device in said indicating and power supply circuits being derived from current supplied by said master power supply circuit and traversing a path in said second trigger-circuit which includes the trigger electrode and the cathode of the control device of any indicating circuit and the trigger electrode and cathode of the power supply circuit.

6. The indicating system of claim 5 further characterized in that said detecting circuit includes rectifying means energized by monitor signal energy from the corresponding source of monitor signals and producing a triggering potential acting upon the trigger electrode and cathode of the appertaining control device to trigger the latter to the conductive state; the trigger potential for control devices of the appertaining indicating-circuit and the power supply circuit, also traversing the anode-cathode path through the control device of the appertaining detecting circuit in its conductive state.

7. The system of claim 6, wherein the aforesaid resetting circuit comprises manually-controlled switch means for interrupting said alternating voltage whereby to interrupt the current flow through the anode-cathode paths in the electron control devices of both the indicating and power supply circuits to restore said devices to the non-conductive state and to cut off the current in said second triggering circuit means, whereby the control device of the appertaining detecting circuits will also be restored to the non-conductive state if triggered.

8. The system of claim 7 wherein said solid-state conductive devices are uni-directionally conductive in the conductive state when triggered.

9. The indicating system of claim 1 wherein said electron control devices are solid state, bi-stable, half-wave rectifiers in the nature of Silicon Controlled Rectifiers each having an anode, a cathode and a trigger electrode, said trigger electrodes constituting the recited control electrode means; and said second trigger circuit means and the included connections with said control electrode means of all indicating circuits and that of the master power power supply circuit constituting a chain circuit extending from one master power supply terminal of the master supply circuit constituting a chain circuit extending of the electron control device of each and every detecting circuit of the system, thence through the trigger electrode and cathode path of the electron control device of the appertaining indicating circuit and returned to the remaining power supply terminal of said master power supply circuit which is of opposite polarity from said first-mentioned terminal thereof in a triggering relation to the trigger circuit of the master power supply control device.

10. Apparatus according to claim 1 wherein said second trigger circuit means includes a time delay circuit connecting with one of the said control electrodes thereof and operative to cause the change to the conductive state of the control device of the master power supply circuit to lag briefly behind the change to conductive state of the concurrently-actuated control device of any indicating circuit.

11. Fault-indicating and supervisory circuit apparatus comprising, in combination with a source of different monitor signals, a plurality of monitoring sets each having an input circuit adapted to receive a different one of said monitor signals, each set including a detecting circuit and a corresponding indicating circuit controlling a corresponding identification indicating means; a power supply circuit commonly serving a desired plurality of said monitoring sets and controlling a master indicating means; the detecting circuit and indicating circuit of each said monitoring set, and the common power supply circuit serving the same, each including a triggerable electroconductive device including a trigger electrode and an anode-cathode conducting path, and having a normal condition in which such path is non-conductive, but is rendered conductive to initiate a current flow therethrough responsive to application of a triggering pulse to the trigger electrode thereof and to remain conductive so long as the initiated current flow therethrough persists without substantial interruption and to return to the normal non-conductive condition responsive to substantial interruption of said initiated current flow; the anode-cathode current conducted by said electro-conductive device in the detecting circuits when triggered as aforesaid being supplied from said common power supply circuit via a chain circuit through the anode-cathode path of any one of said detecting circuits and thence through a trigger to cathode path in its appertaining indicating circuit and through the triggering circuit of the electro-conductive device of the power supply circuit, such that triggering of any detecting circuit in any set triggers the corresponding indicating circuit to actuate the indicating means thereof, thus identifying that particular monitoring set as having responded to a monitor signal in accompaniment with substantially concurrent triggering of the electro-conductive device of the power supply circuit to cause operation of the master indicating means thereof and interrupt power to all monitoring sets; said apparatus further including resetting means operable to interrupt current flow initiated as aforesaid through the electro-conductive device of the power supply and indicating circuits, whereby to restore the said triggered electro-conductive devices to the normal non-conductive state.

12. Apparatus according to claim 11 wherein the said electro-conductive devices each include electrodes comprising an anode, a cathode and a trigger electrode which is adapted to be actuated by application thereto of a voltage of particular polarity relative to one of the other electrodes, and said input circuits each include means for translating the received monitor signals to trigger voltages of said particular polarity.

13. Apparatus according to claim 12 wherein said electro-conductive device is a half-wave Silicon Controlled Rectifier and said input circuit comprises an input transformer having a primary connected to receive a particular monitor signal from said source, and a secondary connecting with full-wave rectifying means the output of which is of said particular polarity and connected to the trigger and cathode electrodes of the appertaining electro-conductive device.

14. Apparatus according to claim 11 wherein said electro-conductive devices each include electrodes comprising a trigger, an anode and a cathode, together with an indicator power supply comprising a source of attending current, means for rectifying said current, means connecting the rectified current to the anode and cathode of the electro-conductive device thereof, an indicating lamp connected for actuation by said current when a path through the anode and cathode is rendered conductive by a trigger pulse.

15. Apparatus as set forth in claim 12 wherein there is provided a normally-open manually-controlled switch shunted across said anode and cathode for operation to cause actuation of said indicating means independently of existence of a conductive path through said anode and cathode thereof.

16. Apparatus according to claim 11 wherein said electron control devices are solid-state, Silicon Controlled half-wave Rectifiers each having a trigger, an anode and a cathode electrode; wherein said input circuit includes means connecting with the trigger and cathode of the corresponding control device to apply a triggering potential thereto; wherein said identification indicating means is connected for operation with a source of alternating current acting through the appertaining anode and cathode in conductive condition; wherein said power supply circuit comprises devices energized from an alternating current source through rectifying means having said master signal means in series therewith through the anode and cathode of the appertaining electro-conductive device; wherein said chain circuit for a given monitor set comprises a path for current from the negative source of said power supply circuit via the cathode and trigger electrodes of the power supply electro-conductive device through the cathode-anode path of any conductive detector control device, and through the cathode and trigger electrodes of the electro-conductive device of the indicating circuit of said set, and returned to the positive source of said power supply circuit.

17. Apparatus according to claim 16 wherein the resetting means comprises a manually-controlled switch connected for operation to interrupt the power from said alternating current source of the power supply circuit, thereby interrupting current flow through the appertaining electro-conductive device and restoring the same to the non-conductive condition.

18. Apparatus as set forth in claim 11 wherein said chain circuit includes a time delay means operative to prevent triggering of the electro-conductive device of the power supply circuit to the conductive state in advance of the triggering to the conductive state responsive to the same monitoring signal of the electro-conductive device of any indicating circuit.

19. In a signalling circuit adapted to respond to monitor signals and the like, triggerable on-off solid state conductive devices each having an anode-cathode path which is normally non-conductive, and a trigger-cathode path which is responsive to a potential to trigger the anode-cathode path into a conductive state sustained so long as said last path is traversed by a predetermined minimal current; first circuit means include a first one of said devices wherein the trigger-cathode circuit is connected for trigger operation by monitor signals as aforesaid; second circuit means including a second one of said devices wherein the trigger-cathode circuit is traversed by current conducted by the anode-cathode path of the first said device; means including a third one of said devices wherein the trigger-cathode path is traversed by current supplied to the anode-cathode path of the first said device for conduction thereby in the conductive state thereof as aforesaid; electrically-controlled signal means connected for actuation dependently upon the presence or absence of the conductive state in the anode-cathode path of the second said device; and further electrically-controlled signal means connected for actuation dependently upon the presence or absence of the conductive state in the third said device.

20. Apparatus according to claim 19 further characterized by the provision of means selectively operable to provide a test conduction path around the anode-cathode path for at least one of said conductive devices.

21. In a fault indicating system, a monitor unit comprising a detector circuit adapted to be actuated by monitor signals from a corresponding source, together with an indicating circuit including a tell-tale indicator particularly identifying said detector circuit; a triggerable electron valve device in said detector circuit and its appertaining indicating circuit, said devices being normally non-conductive and triggerable into a conductive state to conduct control current from a master power supply; each tell-tale indicator being energizable from an independent corresponding power supply which is connected to actuate the tell-tale indicator under control of the corresponding indicator circuit valve device responsive to triggering thereof; a master power supply circuit including a master indicator which is energized by master power; a trigger circuit for each detector circuit valve device connected to be actuated by monitor signals from a corresponding said signal source; a trigger circuit for each indicating circuit valve device connecting with the trigger circuit of the master valve device and control current supplied by said master power supply circuit such that triggering of the detector circuit valve device will result in conduction of control current relative to the trigger circuits of the appertaining indicator valve device as well as the trigger circuit of the master power supply valve device to trigger both said devices substantially concurrently, thereby causing the said tell-tale indicator to be actuated by current from its said independent power supply, and also causing the master power supply indicator to be actuated by master current, followed by a cutting off of control current to the detecting and indicating circuits comprising the monitor unit; and reset means operative to restore triggered valve devices to the non-conductive state in readiness for further triggering responsive to monitor signals as aforesaid.

References Cited

UNITED STATES PATENTS

| | | | |
|---|---|---|---|
| 3,149,306 | 9/1964 | Lesher | 340—332 X |
| 3,381,286 | 4/1968 | Walsh | 340—415 X |

THOMAS B. HABECKER, Primary Examiner

C. M. MARMELSTEIN, Assistant Examiner

U.S. Cl. X.R.

340—415